(No Model.)  5 Sheets—Sheet 1.

T. JOHNSTON.
MEAT CUTTING MACHINE.

No. 319,910. Patented June 9, 1885.

Witnesses:
Jas. E. Hutchinson
Henry C. Hazard

Inventor:
Thos. Johnston, by
Prindle & Russell, his Attys.

(No Model.) 5 Sheets—Sheet 2.

T. JOHNSTON.
MEAT CUTTING MACHINE.

No. 319,910. Patented June 9, 1885.

Witnesses:
Jas. E. Hutchinson
Henry C. Hazard

Inventor:
Thos. Johnston
Dindle & Russell, his Attys (No Model.) 5 Sheets—Sheet 3.

T. JOHNSTON.
MEAT CUTTING MACHINE.

No. 319,910. Patented June 9, 1885.

Witnesses:
Jas. E. Hutchinson
Henry C. Hazard

Inventor.
Thos. Johnston, by
Prindle and Russell, his Attys (No Model.)　　　　　　　　T. JOHNSTON.　　　　　5 Sheets—Sheet 4.
MEAT CUTTING MACHINE.
No. 319,910.　　　　　　　　　　　Patented June 9, 1885.
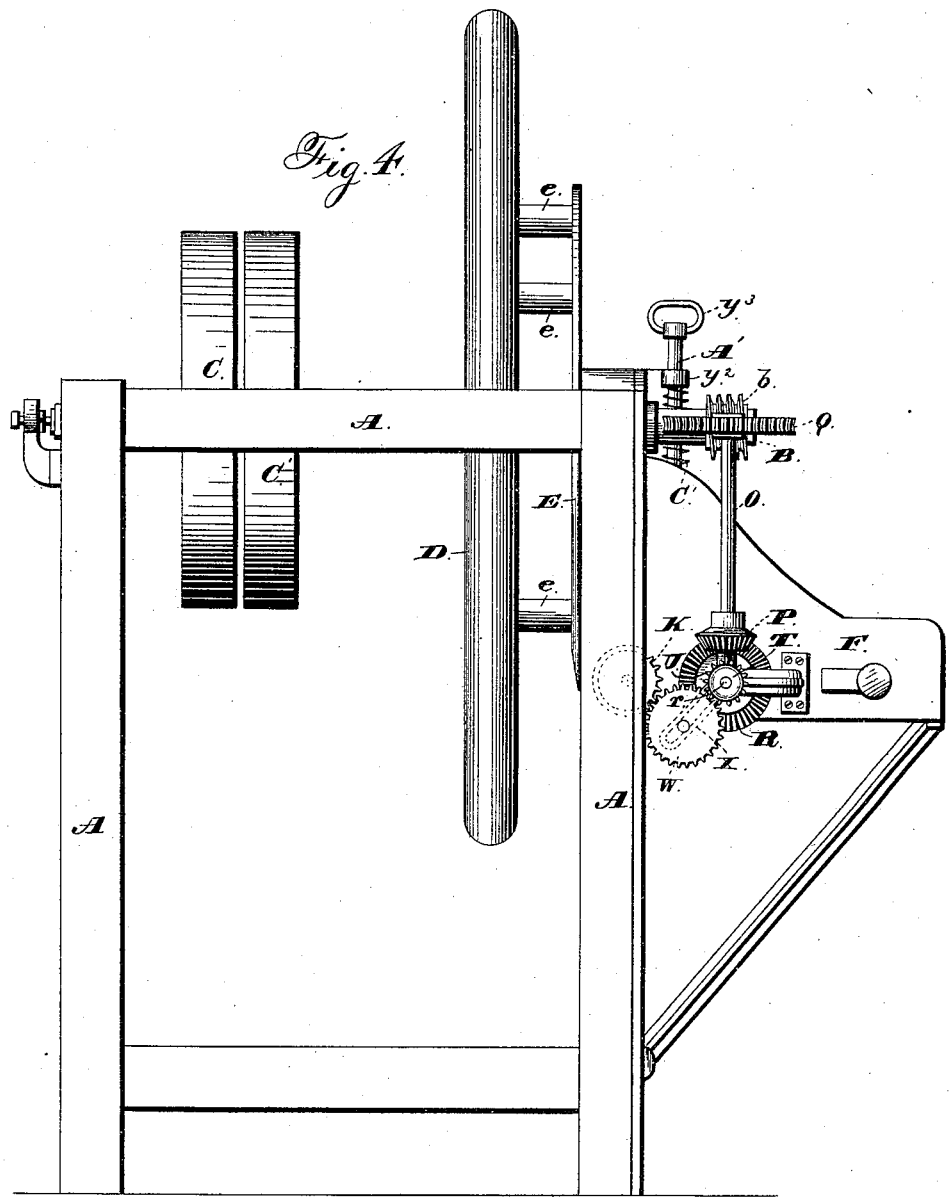

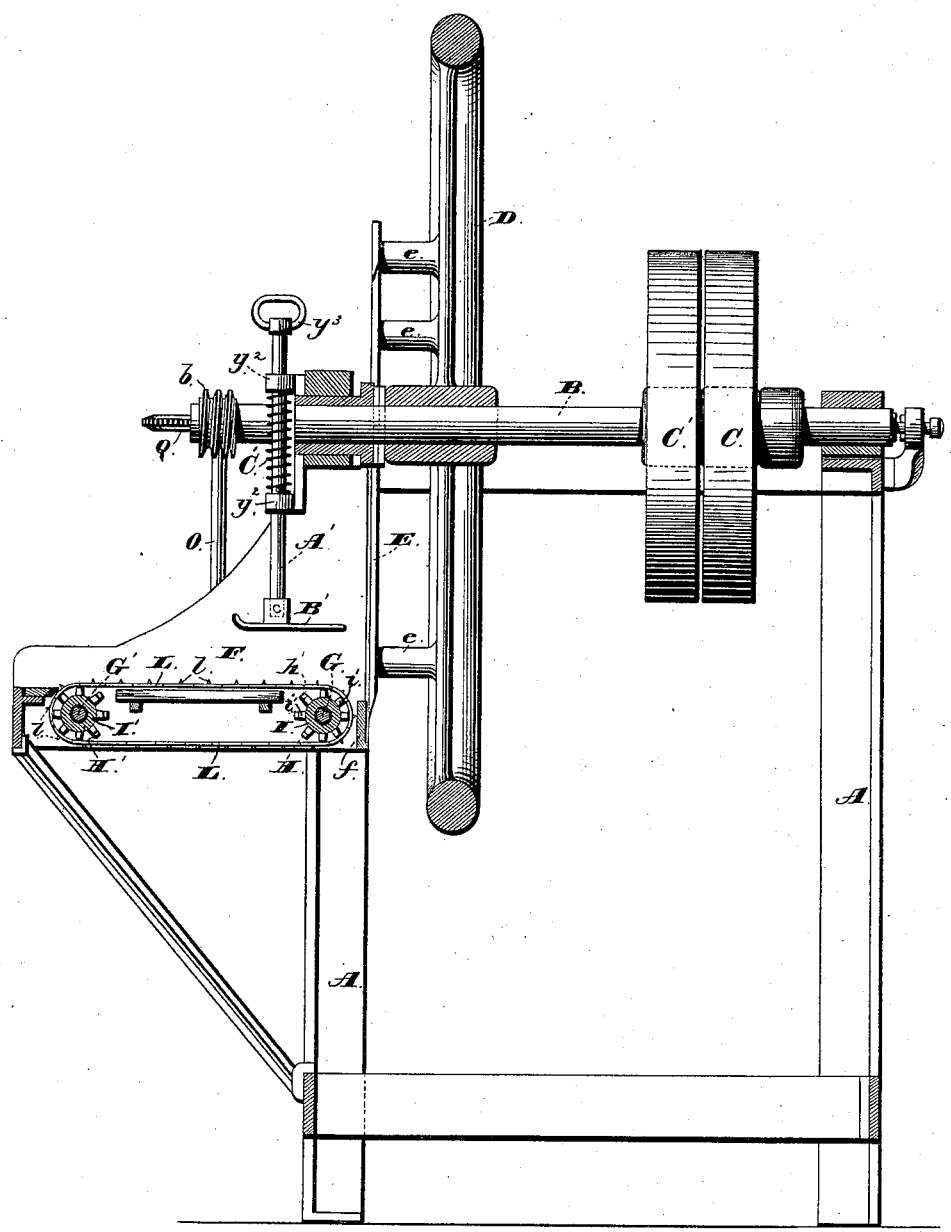

UNITED STATES PATENT OFFICE.

THOMAS JOHNSTON, OF NEWBURG, NEW YORK, ASSIGNOR TO THE CHADBORN & COLDWELL MANUFACTURING COMPANY, OF SAME PLACE.

MEAT-CUTTING MACHINE.

SPECIFICATION forming part of Letters Patent No. 319,910, dated June 9, 1885.

Application filed November 12, 1883. (No model.)

*To all whom it may concern:*

Be it known that I, THOMAS JOHNSTON, of Newburg, in the county of Orange and State of New York, have invented certain new and useful Improvements in Meat-Cutting Machines; and I do hereby declare that the following is a full, clear, and exact description thereof, reference being had to the accompanying drawings, making a part of this specification, in which—

Figure 1:
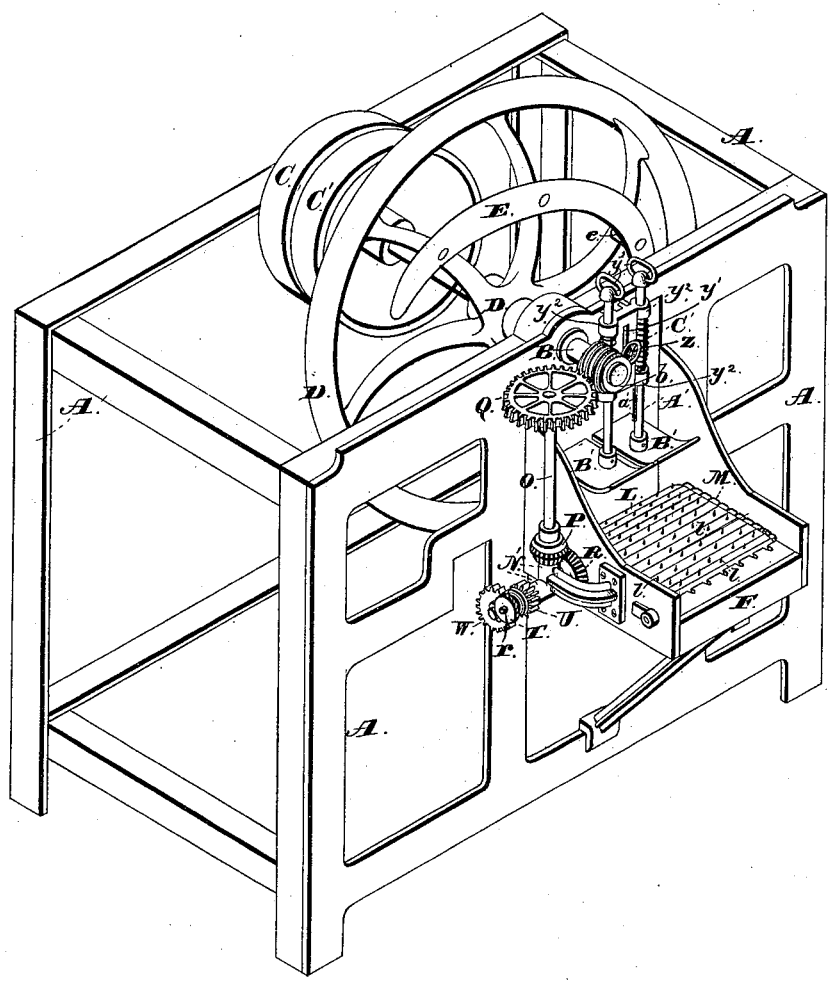
Figure 2:
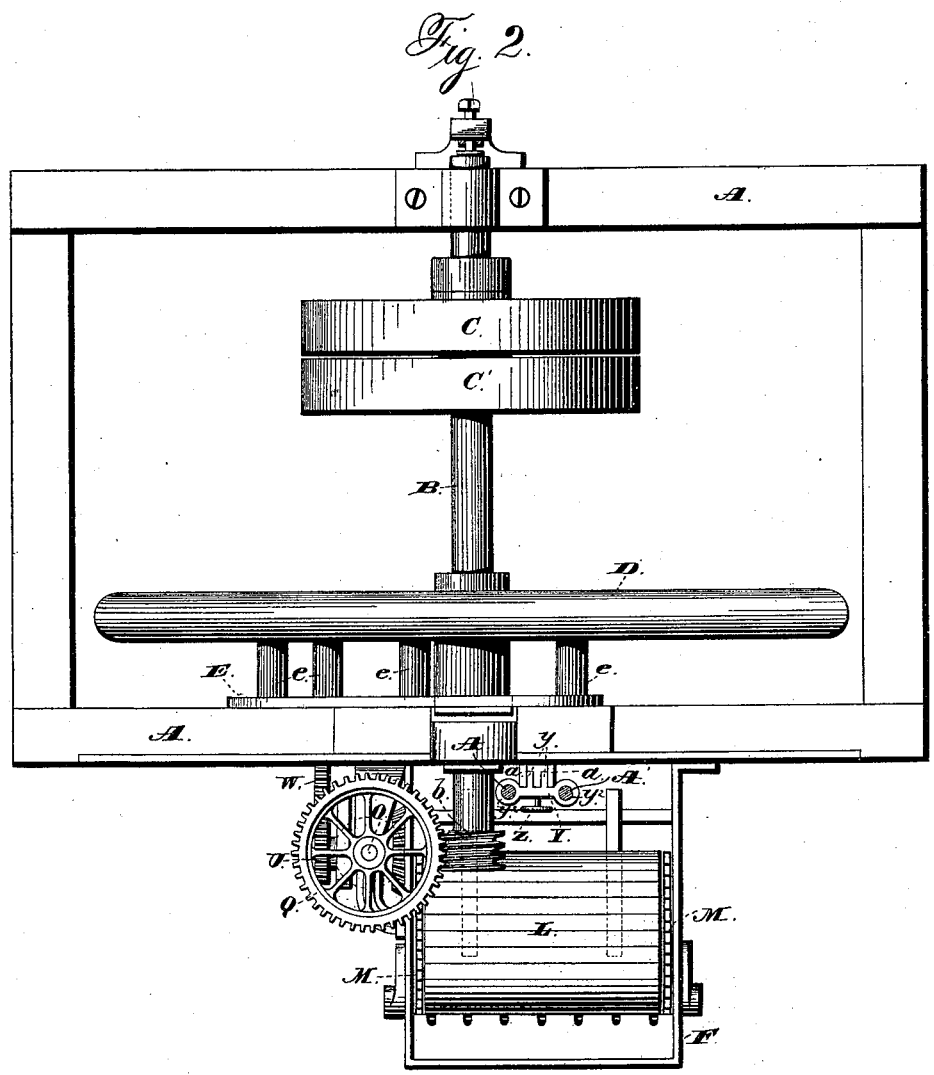
Figure 3:
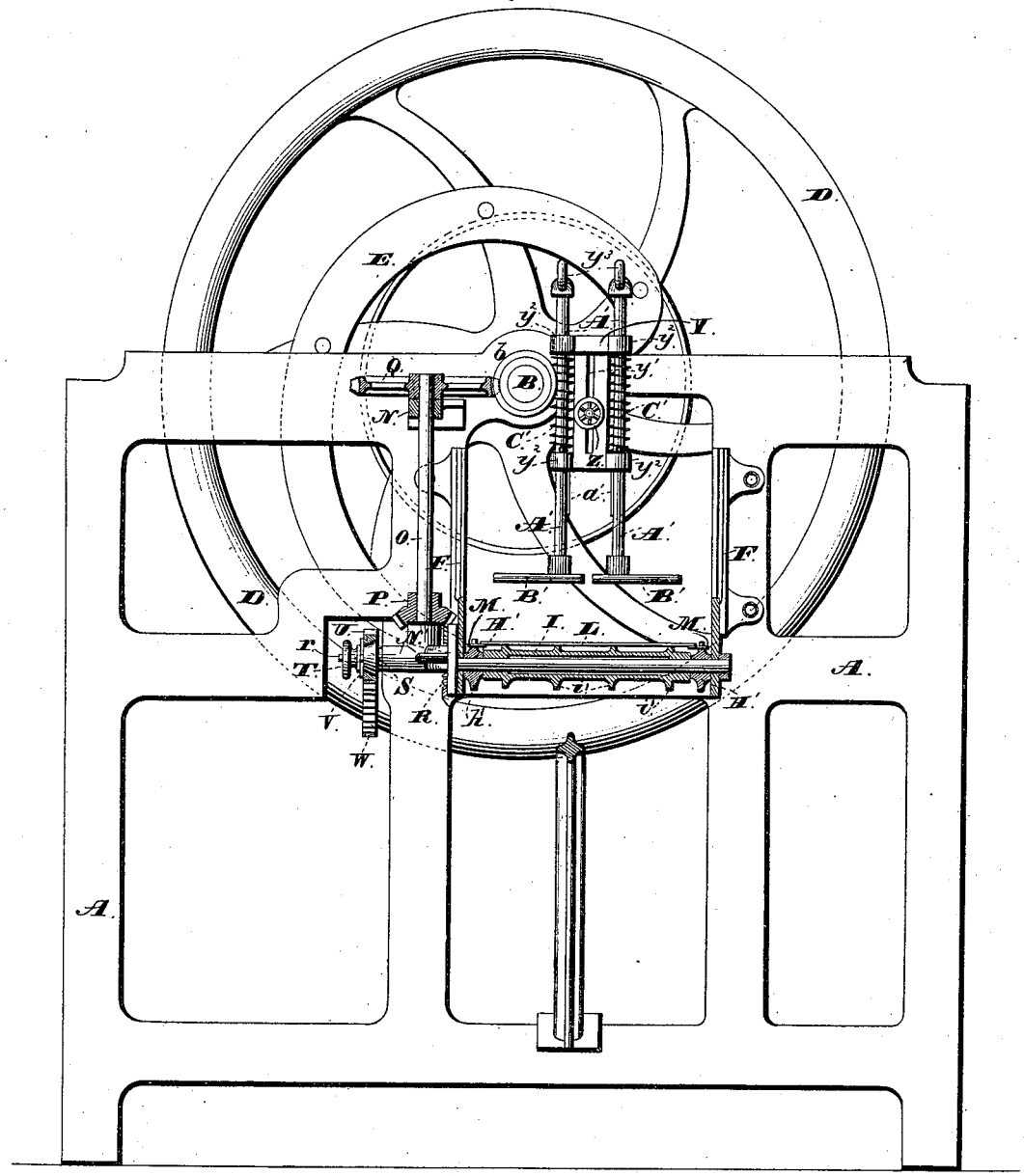

Figure 1 is a perspective view of my machine, the covering or casing being removed. Fig. 2 is a plan view of the same. Fig. 3 is a front elevation of said machine, with some of the operative parts in section. Fig. 4 is an elevation of the same from the side of the feed mechanism; and Fig. 5 is an elevation, partly in section, of the opposite side of the same.

Letters of like name and kind refer to like parts in each of the figures.

The design of my invention is to enable smoked or dried meat to be cheaply and easily sliced or chipped for market; and to this end said invention consists in the construction, arrangement, and combination of parts, as hereinafter specified.

In the annexed drawings, A represents the frame of my machine, which frame is preferably rectangular in its general shape, and has such dimensions as to enable it to properly support the operative mechanism.

Journaled within suitable bearings at the top of the frame A is a shaft, B, which extends horizontally from front to rear across the center of the same, and near its rear end is provided with a fast and a loose belt-pulley, C and C', respectively, and near the opposite end has secured a balance-wheel, D, that is provided with a scroll-shaped knife or cutter, E. Said cutter is connected with said wheel by means of studs $e$, which extend between said parts, and is arranged to revolve in a plane parallel with and near to the inner face of the front side of said frame.

Secured to and extending forward from the front side of the frame A is a bracket-shaped frame, F, which horizontally fills an open central space in the same, and at its inner end terminates in a horizontal bar, which constitutes or supports the stationary knife or cutter, and against the rear edge of which the spiral cutter E impinges as the balance-wheel D revolves.

Immediately in front of and parallel with the stationary cutter $f$ is journaled a horizontal shaft, G, to which, immediately inside of each side of the frame F, is secured a chain-wheel, H, while between said chain wheels is secured a roller, I, that at several points upon its periphery is provided with a circumferential series of spurs, $i'$, which correspond to the teeth $h'$ of said chain-wheels. One end of said shaft extends through its supporting-frame, and has secured thereto a gear-wheel, K, by means of which it is rotated, through mechanism hereinafter described.

Within the outer ends of the frame F is journaled a second shaft, G', which is provided with chain-wheels H' and central roller, I', that are precisely like those of the shaft G, and around said parts is stretched an endless belt or apron, which is composed of bars L, that are arranged flatwise in parallel lines and have their ends connected with two chains, M, which are adapted to engage with and be moved by the said wheels H and H'. Each of said bars L is provided upon its outer face with a series of radial spurs, $l$, that are adapted to engage with meat or other like substance placed upon the upper side of the apron. The upper side of the apron thus constructed is caused to move rearward, so as to cause the article to be sliced to be brought into contact with the revolving cutter, by the following-described means, viz:

Journaled vertically within suitable bearings, N and N', at one side of the frame F, is a shaft, O, which has secured to its lower end, immediately above its bearing N', a bevel-gear, P, and at its upper end is provided with a worm-wheel, Q, that meshes with and is driven by means of a worm, $b$, which is formed upon the projecting end of the shaft B. The bevel-gear P meshes with a similar gear, R, which is secured to one end of a short shaft, $r$, that is journaled horizontally within the lower part of the bearing N', and has upon its opposite outer end a disk or collar, S, with a beveled or conical periphery, and said disk has a reduced threaded portion that receives a hand-nut, T.

Fitted upon or over the conical disk S is a gear-wheel, U, which interiorly is bored to correspond to the periphery of the same, and is held in place by means of a washer, V, that is placed between its outer face and the nut T. As thus arranged, by screwing inward upon said nut said wheel will be caused to fit upon said conical disk with sufficient closeness to cause said wheel to revolve with the shaft r, while by turning said nut outward said wheel will be loosened from said disk and cease to revolve therewith, and by regulating the inward pressure of said nut the amount of friction between said gear-wheel and disk may be adjusted, whereby the meat-feeding mechanism may be stopped or started at pleasure without reference to or stoppage of the other parts of the machine.

The motion of the gear-wheel U is communicated to the gear-wheel K by means of an intermediate gear-wheel, W, which is journaled upon a stud that is secured within a longitudinally-slotted arm, X, which is pivoted upon the bearing N' and is adapted to be turned thereon so as to raise or lower its outer end, while said stud is capable of being adjusted lengthwise of and secured to the slotted portion of said arm. By this arrangement any desired size of intermediate gear may be employed, and the relative velocities of said gear-wheels K and U thereby varied at will.

In order that the meat may be held down upon the apron, the following mechanism is employed, viz: Projecting forward from the front side of the frame A are two vertical parallel bars, $a$, against the front edges of which is placed a head, Y, that upon its rear face is provided with two flanges, $y$, which extend rearward between said bars and operate to hold said head in lateral position thereon, while by means of a screw, Z, that passes inward through the latter, with its threaded end contained in a threaded opening in said frame A, said head is held securely against said bars. The opening $y'$, through which said screw passes, is elongated vertically, so as to enable said head to be adjusted vertically within certain limits, and then secured in place.

Secured to and projecting laterally from each side edge at each end of the head Y are two cylindrical bosses, $y^2$, which are provided with axial openings that receive and contain two round bars, A', each of which passes through the two coinciding bosses upon one side of said head.

To the lower end of each bar A' is secured a plate or foot, B', which has substantially the size shown, and at its front end is turned upward, so as to permit of the ready passage of meat beneath the same. A longitudinal feather, $a'$, secured within each of said bars and passing into a corresponding spline formed in the lower bosses $y^2$, insures the circumferential position of said bar without interfering with the free longitudinal movement of the same. Surrounding each bar A', between the bosses $y^2$, is a spiral spring, C', which at its upper end has a bearing against the lower end of the upper of said bosses, and at its lower end impinges against a shoulder formed upon said bar, or a pin passing through the same, so as to hold said bar with a yielding pressure at the lower limit of its motion, as in case of the presser-bar of a sewing-machine. A ring, $y^3$, at the upper end of each bar A' enables the same to be raised, while any usual means may be employed for locking it in such elevated position.

The machine is now complete and is operated as follows, viz: The presser-bars are moved to their upper limit of motion, and their head then raised to a sufficient height to leave the feeding-apron clear for the reception of meat, and after the latter is in place said head is moved downward until the pressure-feet rest upon the upper side of said meat, and is then secured in place. The presser-bars are now loosened, so as to permit them to exert a downward pressure upon said meat, and the driving-shaft is set in motion. At each revolution of the driving-shaft its cutter slices off a portion of the inner end of each piece of meat, while by means of the feeding mechanism the endless apron, with its load, is moved rearward sufficiently to cause an equal slice to be cut upon the next revolution of said cutter, such operation being continued while the supply of material lasts.

By exercising sufficient care in feeding pieces of meat beneath the presser-feet the operation of the machine can be continued for any desired length of time without interruption.

Having thus fully set forth the nature and merits of my invention, what I claim as new is—

1. In a machine for cutting meat, the combination, with the meat-feeding mechanism, consisting, essentially, of an endless apron upon toothed rollers, a vertical shaft connected with the driving-shaft by a worm and wheel, gear-wheels P, R, and U, and wheel K upon the shaft of the toothed roller which propels the endless apron, of an intermediate interchangeable gear-wheel mounted within a longitudinally-slotted arm pivoted upon the lower bearing of the vertical shaft, substantially as and for the purpose described.

2. The combination, in a machine for cutting meat, of the cutting mechanism, substantially as described, and meat-feeding mechanism, consisting, essentially, of an endless apron upon toothed rollers, a vertical shaft connected with the driving-shaft by a worm and wheel, and suitable gears to connect the apron-moving roller with the vertical shaft, and of the mechanism for holding the meat down upon the apron, consisting, essentially, of one or more spring-actuated presser-feet adjustably secured upon the face of the machine, all constructed to operate in the manner and for the purpose substantially as shown.

3. The combination, in a machine for cutting meat, of cutting mechanism, substantially such as described, and automatically-acting meat-feeding mechanism, consisting, essentially, of an endless apron upon toothed rollers, a vertical shaft connected with the driving-shaft by a worm and wheel, and suitable gear-wheels to connect the vertical shaft with the toothed roller which drives the endless apron, of the cone-shaped disk or collar carrying the gear U, with set-nut for clamping said gear upon the collar, and an intermediate interchangeable gear mounted within a longitudinally-slotted arm, whereby the movement of the meat-feeding mechanism may be stopped or the degree of feed changed at will, all constructed to operate in the manner and for the purpose substantially as shown, and combined with suitable mechanism for holding the meat upon the endless apron.

In testimony that I claim the foregoing I have hereunto set my hand this 1st day of November, 1883.

THOMAS JOHNSTON.

Witnesses:
   CHAS. P. CORWIN,
   CHAS. A. DIXON.